Oct. 23, 1951     W. S. ROBSON ET AL     2,572,200
APPARATUS FOR FORMING AND APPLYING APPENDAGES TO POTTERYWARE
Filed Oct. 24, 1950     2 SHEETS—SHEET 1
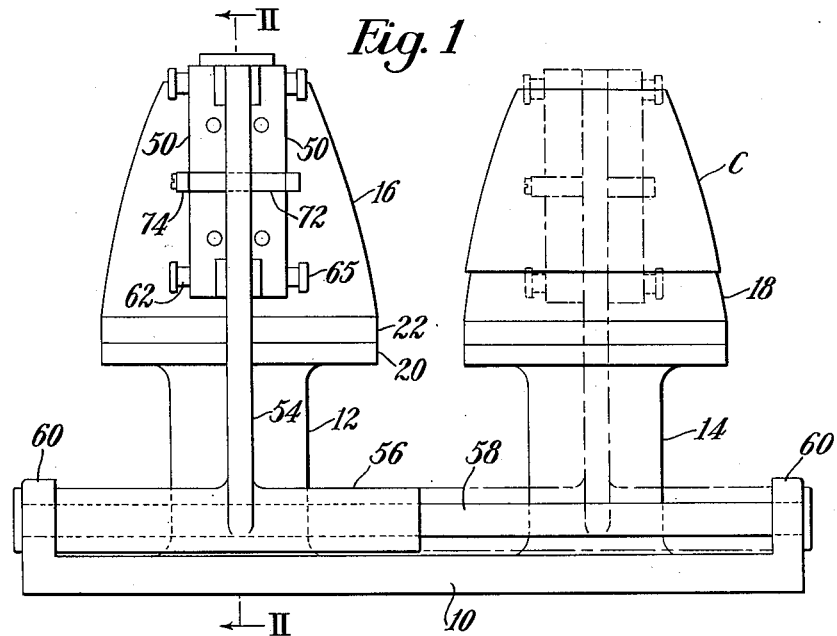
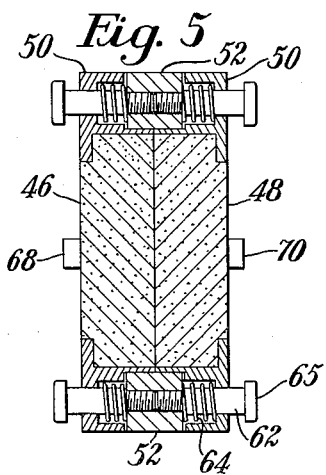
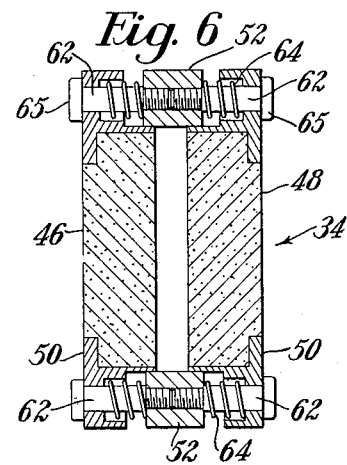
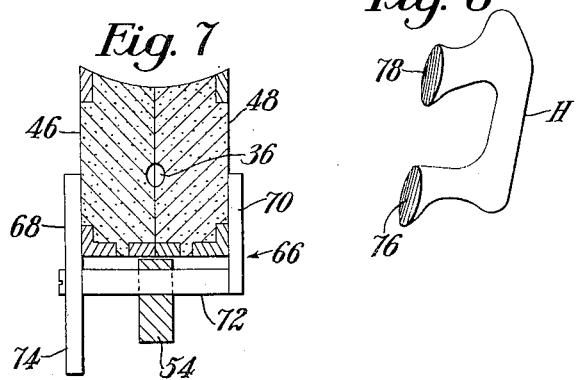
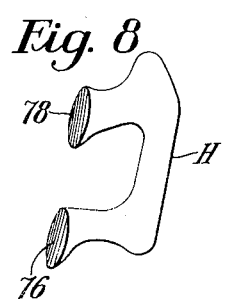
Inventors
William S. Robson
Alan E. Moore
By their Attorney Oct. 23, 1951  W. S. ROBSON ET AL  2,572,200
APPARATUS FOR FORMING AND APPLYING APPENDAGES TO POTTERYWARE
Filed Oct. 24, 1950  2 SHEETS—SHEET 2
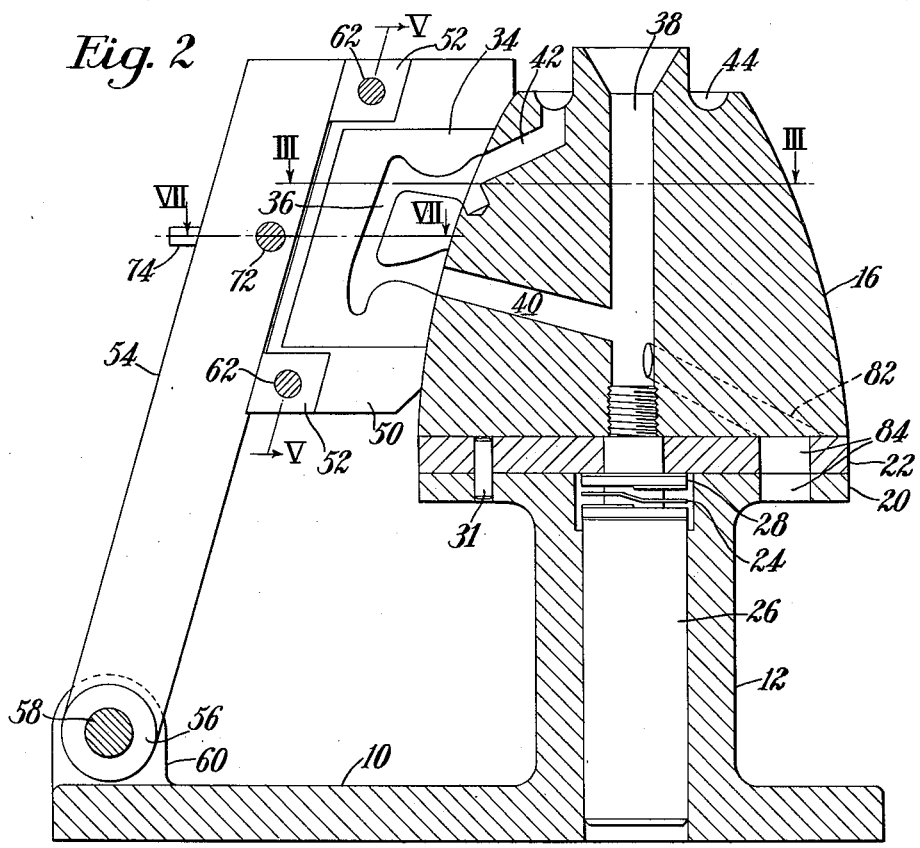
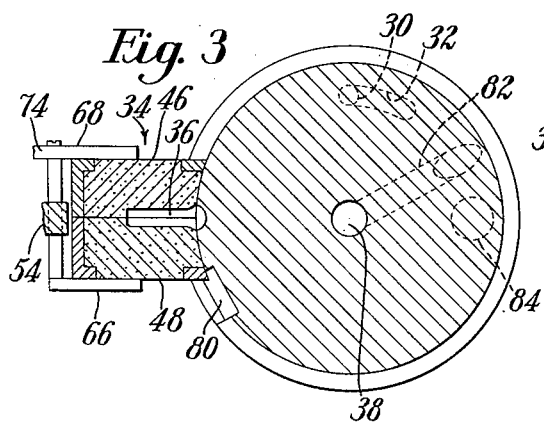
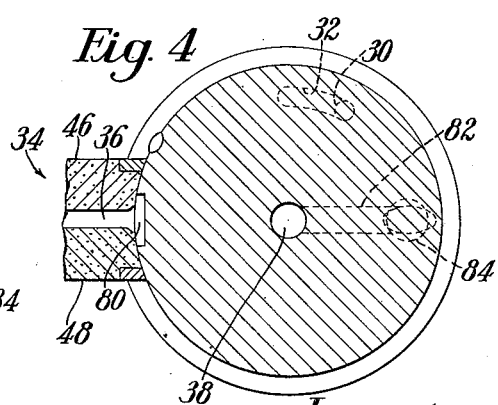
Inventors
William S. Robson
Alan E. Moore
By their Attorney Patented Oct. 23, 1951

2,572,200

UNITED STATES PATENT OFFICE 2,572,200

APPARATUS FOR FORMING AND APPLYING APPENDAGES TO POTTERY WARE

William S. Robson, Barnet, Herts, and Alan Ernest Moore, Leicester, England, assignors to United Shoe Machinery Corporation, Flemington, N. J., a corporation of New Jersey Application October 24, 1950, Serial No. 191,762
In Great Britain November 10, 1949

7 Claims. (Cl. 18—22)

This invention relates to the manufacture of pottery ware and more particularly to apparatus for applying appendages to pottery ware. As illustrated herein the invention is embodied in apparatus for forming and applying handles to cups although it will be understood that the invention is not thus limited in its application.

One well known method of attaching handles to cups makes use of two-part molds which may be formed of plaster of Paris, each part of the mold having suitably shaped recesses to provide, when the molds are fitted together, one or more mold cavities. The molds have one or more passages running to each cavity and through these passages a mixture of clay and water called a fluid slip is poured to fill the mold cavities. The work is allowed to stand for a sufficient period during which water is absorbed by the mold and the clay hardens into a condition which allows the two halves of the mold to be separated and the molded material is then removed by hand. The runners must then be removed from the work and the handles are applied by hand to the cups. Considerable handling of the handles which are in a plastic condition is required, and great skill is required in attaching the handles to the cups without deforming the handles in this operation, rendering the operation tedious and expensive.

Another method of forming and applying handles to cups comprises molding a handle in situ against the body of a cup. One difficulty with this method resides in the fact that the fluid slip which is employed to form the handle tends to shrink away from the cup body as the slip dries thereby providing a weak bond between the cup body and the handle.

It is an object of the present invention to provide improved apparatus for forming and attaching appendages to pottery ware without the necessity of handling of the appendages prior to their attachment to the ware while insuring a firm bond between the appendages and the ware thus overcoming the disadvantages of the methods outlined above. To this end, and in accordance with a feature of the invention, a charging device for a two-part mold is provided, the exterior surface of the charging device being of substantially the same shape as that of the ware to which the appendage is to be applied. The charging device is provided with passages through which the molding material flows into the mold, the mold being mounted for movement into and out of engagement with the charging device and into and out of engagement with a work piece to which the molded appendage is to be applied. The mold has a surface complementary in shape to a portion of the exterior surface of the charging device which is rotatably mounted so that upon turning the charging device after the molded appendage is sufficiently hardened, the attaching faces of the appendage will be trimmed and shaped to fit properly against the work. Following this trimming and shaping operation the mold is moved into engagement with the surface of the work, slip material having first been applied to the attaching faces so that the appendage will adhere to the surface of the work, after which the mold is separated from the appendage, which has thus been formed and attached to the work without any handling thereof. The appendage thus need not be applied to the work until it is hardened to such an extent that no further appreciable shrinkage will take place so that strains between it and the work will not be set up.

The above and other features of the invention, including various novel combinations of parts and details of construction will now be described with reference to the drawings and pointed out in the claims.

In the drawings,

Fig. 1 is a front elevation of one form of apparatus embodying the invention;

Fig. 2 is a section on the line II—II of Fig. 1;

Fig. 3 is a section on the line III—III of Fig. 2;

Fig. 4 is a view similar to Fig. 3 showing one of the parts in a different position;

Fig. 5 is a section on the line V—V of Fig. 2;

Fig. 6 is a view similar to Fig. 5 showing the parts in different positions;

Fig. 7 is a section on the line VII—VII of Fig. 2; and

Fig. 8 is an angular view of a cup handle molded by the apparatus shown herein.

The apparatus is shown as comprising a base plate 10 which may be mounted on a bench and extending upwardly from the base plate are posts 12, 14 carrying respectively a mold charging device 16 and a cup support 18. The post 12 is provided at its upper end with a flange 20 to the top face of which is secured a plate 22. The charging device 16 is held in substantially fluid tight relationship against the upper face of the plate 22 by a spring 24 (Fig. 2) acting between a shoulder formed on a shaft 26 journaled in the post 12 and a washer 28 located below the plate 22, the upper end of the shaft 26 being threaded into the charging device 16. The charging device is thus capable of turning on the plate 22 but is held firmly in engagement with the upper face thereof by the spring 24. A pin 30 (Figs. 3 and 4) depends from the charging device 16 and is received by a slot 32 in the plate 22, the pin and slot cooperating to limit the turning movement of the charging device on the plate 22. A dowel pin 31 cooperates with the shaft 26 in properly locating and holding the plate 22 with respect to the flange 20.

The exterior surface of the charging device is shaped substantially like the article to which the appendage is to be applied, the appendage illustrated herein being a cup handle H (Fig. 8). Cooperating with the charging device 16 is a mold 34 having a cavity 36 therein which is filled with the molding material such as clay slip through a bore 38 in the central portion of the charging device 16, and a bore 40 which communicates with the lower portion of the cavity 36. The upper end of the cavity 36 communicates with a bore 42 in the charging device 16 the upper end of which leads into an annular depression 44 into the upper portion of the charging device. When the mold is brought into engagement with the charging device as will be described, clay slip is poured into the charging device at 30 whence it passes through the bore 40 into the cavity 36 and upwardly into the bore 42. As the moisture from the slip is absorbed by the mold, which is of suitable absorbent material such as plaster of Paris, a shrinkage of material within the cavity 36 occurs and additional slip from the passages 38, 42 will flow into the mold and compensate for the shrinkage due to the loss of water.

The mold 34 consists of two parts 46, 48 (Figs. 5 and 6) each half of the mold being held in a supporting member 50 carried by lugs 52 extending rearwardly from an arm 54. The lower end of arm 54 terminates in a bearing sleeve 56 which is rotatably and slidably mounted on a shaft 58 carried by upstanding ears 60 of the base 10. The supporting members 50 are slidably mounted on studs 62 threaded into the lugs 52, the members 50 being urged outwardly of the lugs by springs 64 surrounding the studs 62 and acting between the lugs and the supporting members thereby normally urging the two halves of the mold apart into engagement with heads 65 of the studs as shown in Fig. 6. For holding the mold members 46, 48 together as shown in Fig. 5 during the molding of the cup handle and its subsequent attachment to a cup, a clip 66 (Fig. 7) is provided. This clip comprises a pair of arms 68, 70 engageable with the outer faces of the mold members 46, 48, these arms being carried by a stud 72 in the arm 54. With the parts in the positions shown in Figs. 5 and 7 the mold members are held together to receive the slip of which the handle is to be formed. After the handle has been subsequently attached to a cup the arms 68, 70 are moved out of contact with the mold members, the arm 68 having a rearwardly extending portion 74 (Fig. 7) to facilitate this movement of the arms by the operator. Separation of the mold members is then effected by the springs 64 (Fig. 6).

After the material of the handle has hardened within the mold 34 the charging device 16 is turned from the position shown in Fig. 3 into the position shown in Fig. 4 whereupon the material in the bores 40, 42 of the charging device 16 is sheared from the handle in the mold 34 and the attaching faces of the handle illustrated at 76, 78 (Fig. 8) are thus shaped properly for attachment of the handle to a cup. It will be understood that the attaching faces of the handle will require curvature both heightwise and transversely of the handle and this is readily accomplished by the turning of the charging device 16 in shearing the material therein from the handle in the mold 34, the charging device being shaped like the cup to which the handle is to be applied. The charging device 16 has in its surface a recessed portion 80 (Fig. 4) which lies opposite the cavity in the mold so that the material in the mold is not in engagement with the charging device after this device is turned into the position shown in Fig. 4. The charging device also has a passageway 82 which moves into communication with holes 84 in the plate 22 and the flange 20 so that the slip material may be discharged from the device 16 through the bore 82 and the holes 84 to clear it for the next molding operation.

The handle now being hardened in the mold 34, the arm 54 is moved forwardly by turning it about the shaft 58 and is slid along the shaft into the broken line position shown in Fig. 1 opposite a cup C on the cup support 18. A small quantity of "sticking up" slip is applied to the faces 76, 78 of the handle after which the mold 34 with the handle therein is moved into engagement with the cup by turning the arm 54 about the shaft 48. After the work has been allowed to stand for a short period with the handle against the cup the arms 68, 70 are swung away from the mold members 46, 48 permitting separation of the two parts of the mold thus leaving the handle H affixed to the cup C. The combined handle and cup may then be treated in any conventional manner to complete the manufacture of the cup. The mold can be washed and dried after which it may be used again.

It will thus be seen that the handle is formed and affixed to the cup without any handling by the operator, the molding of the handle, however, being effected out of contact with the cup thus eliminating the possibility of the handle shrinking away from the cup during the hardening process and forming a weak joint between the handle and the cup. Furthermore the mold being filled through the attaching faces which are subsequently shaped by rotation of the charging device the handle is properly shaped for attachment to the cup and is devoid of runners which must later be removed from the handle with the possibility of the work being damaged thereby.

Having thus described the invention, what we claim as new and desire to secure by Letters Patent of the United States is:

1. Apparatus for forming appendages to be applied to pottery ware comprising a mold, a mold charging device, said device having an exterior shape, a portion of which corresponds to that portion of the ware to which the appendage is to be applied, said mold having a surface complementary to said portion of the charging device, said mold having a mold cavity opening into said surface, a passage through said charging device for molding material, said passage being arranged to communicate with said mold cavity, and means mounting said charging device for turning movement relative to said mold.

2. Apparatus for forming appendages to be applied to pottery ware comprising a mold, a mold charging device, means mounting said mold for movement into and out of engagement with said charging device, said charging device having an exterior surface, a portion of which corresponds in shape to that portion of the exterior surface of the ware to which the appendage is to be applied, said mold having a surface complementary to said portion of the charging device and having a mold cavity opening into said surface and arranged so that the attaching surfaces of the appendage lie in said surface, a passage through said charging device for molding material arranged to communicate with the mold cavity, and means mounting said charging device for turning movement relative to said mold.

3. Apparatus for forming and applying appendages to pottery ware comprising a mold, a mold charging device, a ware support, means mounting said mold for movement into and out of engagement with said charging device and with a work piece on said ware support, a portion of the exterior surface of said charging device being shaped to correspond with the exterior surface of the work on the ware support, said mold having a surface complementary to said portion of the charging device and having a mold cavity opening into said surface, a passage through said charging device for molding material, said passage being arranged to communicate with the mold cavity with the mold in engagement with the charging device, and means mounting said charging device for turning movement relative to said mold to interrupt communication between the passage therethrough and the mold cavity and to trim the attaching faces of the molded appendage for subsequent attachment to the work.

4. Apparatus for forming and applying appendages to pottery ware comprising a mold, a mold charging device, a ware support, means mounting said mold for movement into and out of engagement with said charging device and with a work piece on said ware support, a portion of the exterior surface of said charging device being shaped to correspond with the exterior surface of the work on the ware support, said mold having a surface complementary to said portion of the charging device and having a mold cavity opening into said surface, a passage through said charging device for molding material, said passage being arranged to communicate with the mold cavity with the mold in engagement with the charging device, means mounting said charging device for turning movement relative to said mold to interrupt communication between the passage therethrough and the mold cavity and to trim the attaching faces of the molded appendage for subsequent attachment to the work, said mold being formed in two parts arranged upon separation thereof to free the appendage therefrom, means for holding said parts together, and means for normally urging said parts away from each other.

5. Apparatus for forming and applying appendages to pottery ware comprising a mold charging device, a portion of the exterior surface of which has a shape similar to that portion of the ware to which the appendage is to be applied, a ware support, an appendage mold having a surface complementary to said portion of the mold charging device, and means mounting said mold for movement into and out of engagement with the charging device and with a work piece on the ware support, said mold being arranged when in engagement with said charging device to be charged with molding material therefrom.

6. Apparatus for forming and applying appendages to pottery ware comprising a mold charging device, a portion of the exterior surface of which has a shape similar to that portion of the ware to which the appendage is to be applied, a ware support, an appendage mold having a surface complementary to said portion of the mold charging device, means mounting said mold for movement into and out of engagement with the charging device and a work piece on the ware support, said mold being arranged when in engagement with said charging device to be charged with molding material therefrom, and means mounting said charging device for rotation to cut off the flow of molding material to the mold and to trim the attaching faces of the molded appendage for subsequent attachment to the work.

7. Apparatus for forming and applying appendages to pottery ware comprising a mold charging device, a portion of the exterior surface of which has a shape similar to that portion of the ware to which the appendage is to be applied, a ware support, an appendage mold having a surface complementary to said portion of the mold charging device, means mounting said mold for movement into and out of engagement with the charging device and a work piece on the ware support, said mold being arranged when in engagement with said charging device to be charged with molding material therefrom, means mounting said charging device for rotation to cut off the flow of molding material to the mold and to trim the attaching faces of the molded appendage for subsequent attachment to the work, said mold being formed in two parts arranged to separate and free the mold appendage therefrom, said mold parts being formed of moisture absorbing material, means normally urging said parts away from each other, and means for holding said parts together until the appendage has been applied to the work.

W. S. ROBSON.
ALAN ERNEST MOORE.

No references cited.